United States Patent
Rao et al.

(10) Patent No.: US 11,379,227 B2
(45) Date of Patent: Jul. 5, 2022

(54) EXTRAQUERY CONTEXT-AIDED SEARCH INTENT DETECTION

(71) Applicant: Microsoft Technology Licensing, LLC, Redmond, WA (US)

(72) Inventors: Nikitha Rao, Bangalore (IN); Chetan Bansal, Seattle, WA (US); Zhongyan Guan, Redmond, WA (US); Mark Alistair Wilson-Thomas, Mercer Island, WA (US); Nachiappan Nagappan, Bellevue, WA (US); Thomas Michael Josef Zimmermann, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 17/062,581

(22) Filed: Oct. 3, 2020

(65) Prior Publication Data
US 2022/0107802 A1    Apr. 7, 2022

(51) Int. Cl.
*G06F 9/44* (2018.01)
*G06F 8/77* (2018.01)
(Continued)

(52) U.S. Cl.
CPC ............ *G06F 8/77* (2013.01); *G06F 16/2453* (2019.01); *G06F 16/953* (2019.01); *G06N 20/00* (2019.01)

(58) Field of Classification Search
CPC ...... G06F 8/77; G06F 16/953; G06F 16/2453; G06N 20/00
(Continued)

(56) References Cited

U.S. PATENT DOCUMENTS

| 8,566,789 B2 | 10/2013 | Siddaramappa et al. |
| 2007/0288910 A1 | 12/2007 | Bhat et al. |

(Continued)

FOREIGN PATENT DOCUMENTS

WO    2015143639 A1    10/2015

OTHER PUBLICATIONS

Kraft, et al., "YIQ: Contextual Search at the Point of Inspiration", In Proceedings of the 14th ACM International Conference on Information and Knowledge Management, Oct. 31, 2005, pp. 816-823.

(Continued)

*Primary Examiner* — Chuck O Kendall
(74) *Attorney, Agent, or Firm* — Ogilvie Law Firm

(57) ABSTRACT

Embodiments promote searcher productivity and efficient search engine usage by using extraquery context to detect a searcher's intent, and using detected intent to match searches to well-suited search providers. Extraquery context may include cursor location, open files, and other editing information, tool state, tool configuration or environment, project metadata, and other information external to actual search query text. Search intent may be code (seeking snippets) or non-code (seeking documentation), and sub-intents may be distinguished for different kinds of documentation or different programming languages. Search provider capabilities may reflect input formats such as natural language or logical operator usage, or content scope such as web-wide or local, or other search provider technical characteristics. Search intent detection permits efficient and effective use of a single search box for a wide variety of different searches for different kinds of results, thereby simplifying a development tool user interface.

20 Claims, 4 Drawing Sheets

(51) Int. Cl.
*G06F 16/953* (2019.01)
*G06N 20/00* (2019.01)
*G06F 16/2453* (2019.01)

(58) Field of Classification Search
USPC .................................................. 717/112, 143
See application file for complete search history.

(56) References Cited

U.S. PATENT DOCUMENTS

| | | | |
|---|---|---|---|
| 2008/0271006 | A1 | 10/2008 | Nagappan et al. |
| 2008/0320457 | A1 | 12/2008 | King et al. |
| 2009/0144698 | A1 | 6/2009 | Fanning et al. |
| 2010/0299305 | A1 | 11/2010 | Laxman et al. |
| 2011/0041120 | A1 | 2/2011 | Nagappan et al. |
| 2011/0161932 | A1 | 6/2011 | Nagappan et al. |
| 2012/0331439 | A1 | 12/2012 | Zimmermann et al. |
| 2013/0110423 | A1 | 5/2013 | Zimmermann et al. |
| 2014/0109106 | A1 | 4/2014 | Fanning et al. |
| 2015/0126254 | A1 | 5/2015 | Zimmermann et al. |
| 2017/0068612 | A1 | 3/2017 | Herzig et al. |
| 2017/0286276 | A1 | 10/2017 | Herzig et al. |
| 2018/0191862 | A1 | 7/2018 | Encarnacion et al. |
| 2018/0262457 | A1 | 9/2018 | Bansal et al. |
| 2019/0036849 | A1 | 1/2019 | Uppala et al. |
| 2019/0089655 | A1 | 3/2019 | Uppala et al. |
| 2019/0149488 | A1 | 5/2019 | Bansal et al. |
| 2019/0155802 | A1* | 5/2019 | Miller .................. G06F 16/235 |
| 2019/0295694 | A1 | 9/2019 | Holm et al. |

OTHER PUBLICATIONS

"International Search Report and Written Opinion Issued in PCT Application No. PCT/US21/042128", dated Nov. 5, 2021, 14 Pages.
"Active learning (machine learning)", retrieved from <<https://en.wikipedia.org/wiki/Active_learning_(machine_learning)>, Sep. 11, 2020, 4 pages.
"Navigate code", retrieved from <<https://docs.microsoft.com/en-us/visualstudio/ide/navigating-code?view=vs-2019>>, Nov. 21, 2019, 8 pages.
"Code Search", retrieved from <<https://marketplace.visualstudio.com/items?itemName=ms.vss-code-search>>, no later than Sep. 11, 2020, 3 pages.
"Find/Command box", retrieved from <<https://docs.microsoft.com/en-us/visualstudio/ide/find-command-box?view=vs-2019>>, Nov. 4, 2016, 2 pages.
"Microsoft MyAnalytics", retrieved from <<https://www.microsoft.com/en-us/microsoft-365/business/myanalytics-personal-analytics>>, no later than Sep. 11, 2020, 4 pages.
Rao, et al., "Investigating Users' Web Search Behaviour for Software Engineering and Maintenance Tasks", retrieved from <<https://arxiv.org/pdf/1912.09519.pdf>>, arXiv:1912.09519v2 [cs.SE], May 30, 2020, 12 pages.
Yan, et al., "Are the Code Snippets What We Are Searching for?", retrieved from <<http://www.mysmu.edu/faculty/xjiang/papers/saner20cosbench.pdf>>, Feb. 18, 2020, 11 pages.
Mureşan, "Search features in Visual Studio Code", retrieved from <<https://dev.to/codevault/search-features-in-visual-studio-code-2a0c#:~:text=3)%20Search%20local%20symbol%20(%20CTRL,the%20command%20pallete%20and%20type%20%40%20>>, Nov. 11, 2018, 7 pages.
"Supervised learning", retrieved from <<https://en.wikipedia.org/wiki/Supervised_learning>>, Aug. 16, 2020, 8 pages.
Bansal, et al., "The Usage of Web Search for Software Engineering", retrieved from <<https://arxiv.org/abs/1912.09519v1>>, Dec. 19, 2019, 8 pages.
"Search feature team statement on Visual Studio® tool (VS) search functionality", no later than Sep. 9, 2020, 1 page.
"Weak supervision", retrieved from <<https://en.wikipedia.org/wiki/Weak_supervision>>, Aug. 28, 2020, 4 pages.
Oberstein, "Cracking the Code: Determining How Google Interprets Intent", retrieved from <<https://www.rankranger.com/blog/determining-google-intent>>, Jan. 9, 2019, 21 pages.
Haire, "Amazon Keyword Research: Using User Intent to Focus Your Keyword Research", retrieved from <<https://medium.com/@MarketingChimp1/amazon-keyword-research-using-user-intent-to-focus-your-keyword-research-30354f2d54aa>>, Jun. 10, 2018.
Indig, "How Atlassian maps user intent for thousands of keywords", retrieved from <<https://www.reforge.com/brief/how-atlassian-maps-user-intent-for-thousands-of-keywords#3eYv3gAyUOyrCnTC2jHN4A>>, Sep. 6, 2018, 32 pages.
Tsur, et al., "Identifying Web Queries with Question Intent", retrieved from <<https://research.yahoo.com/mobstor/publication_attachments/prefex-www-camera-ready.pdf>>, Apr. 11, 2016, 11 pages.
"Yandex Search", retrieved from <<https://en.wikjpedia.org/wiki/Yandex_Search>>, Aug. 27, 2020, 14 pages.

* cited by examiner

SOME EXAMPLES OF SEARCH PROVIDERS 214

| SOFTWARE DOCUMENTATION 402 SEARCH PROVIDER 404 | | |
|---|---|---|
| SOLUTION 406 SEARCH PROVIDER 408 | REGEX 410 SEARCH PROVIDER 412 | REPOSITORY 414 SEARCH PROVIDER 416 |
| NATURAL LANGUAGE 418 SEARCH PROVIDER 420 | | |
| WEB SITES 422 SEARCH PROVIDER 424 | | PROJECT 436 SEARCH PROVIDER 438 |
| DEVELOPER SITE 426 SEARCH PROVIDER 428 | | |
| AUTOCREATION SEARCH PROVIDER 430 | | LOCAL FILES 440 SEARCH PROVIDER 442 |
| SOURCE CODE 432 SEARCH PROVIDER 434 | | |

Fig. 4

CATEGORIES 500, OTHER ASPECTS OF SEARCH CONTEXT INFORMATION 206

| USER EDITING INFO 502 | PROJECT METADATA 510 |
|---|---|
| USER NOTIFICATION 504 INFO 506 | TOOL CONFIGURATION 512 INFO 514 |
| SEARCH INTENT HISTORY 508 | TOOL ENVIRONMENT 516 INFO 518 |
| TEXT PORTION 520 WITHIN DISTANCE 522 OF CURSOR 524 IN FILE 440 | |
| WARNING / ERROR MESSAGE 528 / 530 | FORMAT 548 / ELAPSED TIME 532 |
| BREAKPOINT 534 LOCATION 536 | BOOKMARK 538 LOCATION 540 |
| TOOL 320 STATE 542 INFORMATION 544 | PROGRAMMING LANGUAGE 546 |

Fig. 5

SOME ASPECTS OF SEARCH RESULTS 210

| LIBRARY 602 | PACKAGE 604 | APPLICATION PROGRAM INTERFACE 606 |

Fig. 6

EXTRAQUERY CONTEXT-AIDED SEARCH INTENT DETECTION

BACKGROUND

The creation, installation, administration, enhancement, correction, and evaluation of technical equipment, including computer hardware and software, is an ongoing, complex, and important set of efforts by individuals and by teams. Some of these efforts may at times overlap or interact with these or other efforts. Experience, training, and critical thinking skills all have great value, but even so much of the information that guides or may assist these technical efforts is not immediately known to the people who can use it. Instead, technical information is kept in user manuals, installation guides, product reviews, knowledge bases and other databases, forum discussions, blog postings, and other forms. In particular, large amounts of technical information about software items take the form of software source code or documentation discussing source code.

To help people locate information that may be useful in particular situations, search engines are often used. Given a keyword or other query text as guidance, a search engine will locate potentially relevant web site or other search results and provide them to a user for review. In some cases, the query may be given in a natural language, from which the search engine will extract key tokens, to help increase ease of use. Likewise, spoken queries may be automatically converted to text. Suggestions for completing a query may be offered while the user types, based on past queries, to aid use of the search engine and to help focus the search. Constraints such as a particular web site to search, or a time frame for the dates ascribed to search results, may be given to focus the search. Logic connectors such as AND, OR, and NOT may also be used to combine keywords or phrases in a query to help increase search result relevance.

Nonetheless, further improvements in search technology are possible.

SUMMARY

Some embodiments promote user search productivity by automatically using context from outside a query to help determine a user's intent, and by using that determination to send the search to the most well-suited search engine(s). For example, some search engines are better suited to search for source code snippets than other search engines, so determining whether the user intends to receive source code as a search result allows more efficient use of available search engines. Even when a non-code search is intended, some embodiments contextually distinguish sub-intents, for use in filtering or ranking search results.

Some embodiments use or provide a computing hardware and software combination which includes a digital memory and a processor which is in operable communication with the memory. The processor is configured, e.g., by tailored software, to perform certain steps for intent-based search optimization. This embodiment receives a search request via a user interface. The search request includes a current query text, which upon receipt belongs to a set of query texts received by or accessed by the embodiment. The embodiment gathers search context information which includes more than the set of query texts; this search context information is also referred to as "extraquery" context. The embodiment detects a search intent based on at least a portion of the gathered search context information, thereby distinguishing a code search intent from a non-code search intent or distinguishing between non-code search intents, or both. The embodiment selects a search provider from a set of search providers which have respective search capabilities; the search provider is selected by matching the detected search intent with a search capability of the selected search provider. Then the embodiment forwards the current query text (or a request derived from it) to the selected search provider as a search request, while avoiding sending such a request to non-selected search providers because their search capability does not match the detected search intent. Thus, the embodiment optimizes a search by avoiding or reducing usage of search providers whose search capability does not match the detected search intent.

Some embodiments use or provide steps for a software development method for promoting search efficiency using context-based search intent detection method. The steps may include: receiving a search request via a user interface of a software development tool, the search request including a current query text which upon receipt belongs to a set of query texts received by or accessed by the software development tool; automatically gathering search context information which includes more than the set of query texts and a query history derived from the set of query texts; automatically detecting a search intent based on at least a portion of the gathered search context information, including distinguishing a code search intent from a non-code search intent or distinguishing between non-code search intents, or both; automatically matching the detected search intent with a search capability of a search provider, the search provider belonging to a set of search providers which are in operable communication with the software development tool; automatically forwarding the current query text or a request derived from it to the search provider; and automatically avoiding sending the current query text or request derived from it to a different search provider of the set whose search capability does not match the detected search intent.

Some embodiments use or provide a computer-readable storage medium configured with data and instructions, or use other computing items, which upon execution by a processor cause a computing system to perform a software development method for promoting search efficiency using context-based search intent detection. This method includes: receiving a search request via a user interface of a software development tool, the search request including a current query text which upon receipt belongs to a set of query texts received by or accessed by the software development tool; automatically gathering search context information which includes more than the set of query texts; automatically detecting a search intent based on at least a portion of the gathered search context information, including distinguishing a code search intent from a non-code search intent or distinguishing between non-code search intents, or both; automatically matching the detected search intent with a search capability of a search provider, the search provider belonging to a set of at least three search providers which are in operable communication with the software development tool, at least one of the search capabilities being a local source code search capability for searching source code on a machine that is running the software development tool; automatically forwarding the current query text or a request derived from it to the search provider; and automatically avoiding sending the current query text or request derived from it the current query text to a different search provider of the set whose search capability does not match the detected search intent.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some examples of search providers;

FIG. 5 is a block diagram illustrating some examples of search context information;

FIG. 6 is a block diagram illustrating some examples of searched or searchable content;

DETAILED DESCRIPTION

Overview

Figure 1:
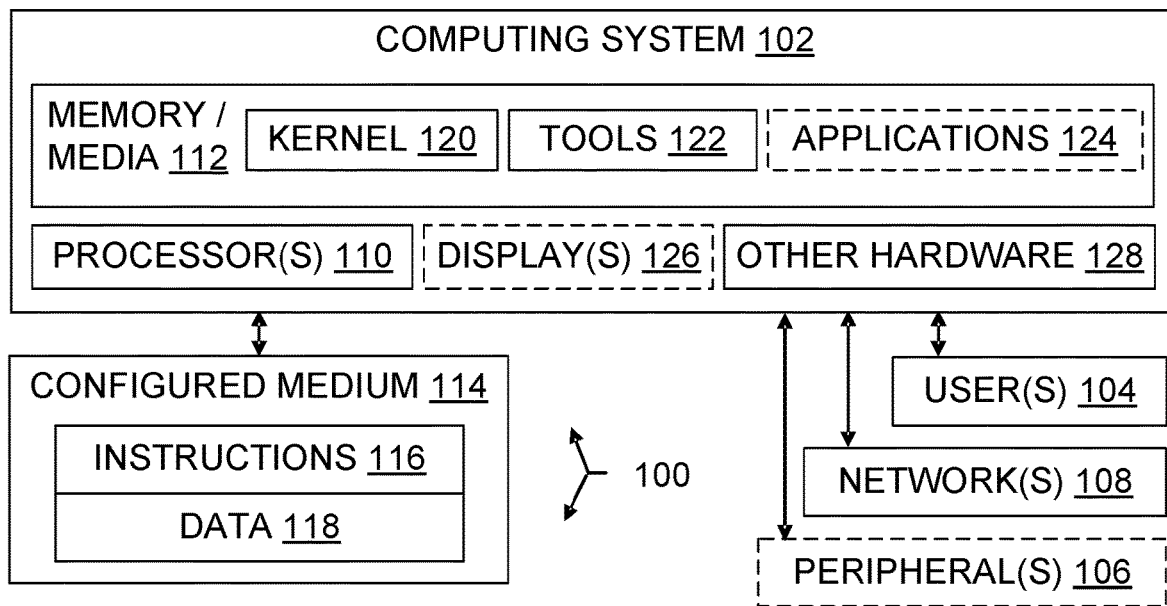
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the usability, efficiency, and effectiveness of Microsoft software development offerings, including versions of tools provided under the marks Visual Studio®, Azure® DevOps, or VSCode™ (marks of Microsoft Corporation). Teachings herein also apply to other software development tools, and in particular may be applied to versions of repository software provided under the marks GitHub® (mark of GitHub, Inc.), BitBucket® (mark of Atlassian Pty Ltd), or SourceForge® (mark of SourceForge Media, LLC), to name just a few examples. Search tools that are used by people other than software developers may also be improved by applying teachings herein to detect non-code search sub-intents for use in ranking or filtering search results.

The innovators understood that software development often involves more than writing or debugging software. A significant portion of the time and effort involved in software development is spent searching for information, and software source code is only one form of information. Indeed, the innovators' insights support a broad view of software development that includes the creation, installation, administration, enhancement, correction, or evaluation of technical equipment, to the extent those activities involve software, including for example the development or use of devices which contain computer hardware and software.

The innovators also considered implications of the fact that different search engines have different search capabilities, and determined that one may view search engines as search providers whose search capabilities are focused in particular ways. Some search providers are able to provide useful search results in response to search queries posed in a natural language (English, Spanish, Chinese, etc.), while other search providers lack that capability. Some search providers excel at searching a remote software source code repository, while some are configured to search a local filesystem or a local software development project or another local collection of source code, for example. Some search providers have access to billions of web pages, while others focus on a more limited document collection or even on a particular database.

The innovators also concluded that for some search tools, aspects of search intent are inherently clear from use of the tool. For example, suppose a given tool only searches a local project for source code, and suppose this capability limitation is known to users of the search tool. Then the user's search intent is presumptively—if not definitively—an intent to search for source code, as opposed, e.g., to an intent to search for a review comparing different software products. But in other cases, search intent is not inherently clear from use of a given tool, because the tool can return various kinds of search results that match various search intents. A general-purpose web search engine, for example, may return both source code and non-code results in response to a particular query.

In view of the foregoing, some embodiments described herein help user productivity and search efficiency by automatically determining aspects of the user's intent behind a search and using that determination to give the search to the most well-suited search engines. For example, because some search engines are better suited to search for source code snippets than other search engines, determining whether the user intends to receive source code as a search result allows more efficient use of both code search and non-code search engines. Even when a non-code search is intended, an embodiment may distinguish sub-intents that can be used to filter or rank search results.

For example, a search for "linux encryption" given to a general purpose web search engine may produce results that include administrator's guides, installation guides, a comparison of different encryption tools, discussions of how to create an encrypted filesystem, discussions of how to encrypt a drive, an overview of encryption advantages and disadvantages, and other kinds of results. If an embodiment detects an installation search sub-intent, for instance, then the installation guides found by the web search engine can be ranked higher than other search results, and those other results can either be de-emphasized or left unreported to the user, or both.

Thus, a technical challenge faced by the innovators was to how to automatically and efficiently detect search intent when a search request is directed at a given tool and the search intent in not clear merely from use of the given tool. One emergent subsidiary challenge was how to distinguish between code search and non-code search intents. Another technical challenge was how to define non-code search sub-intents so they are useful for ranking or filtering search results. One of skill will recognize these and other technical challenges as they are addressed at various points within the present disclosure.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, functionality for optimizing search provider usage based on search intent detection which uses extraquery context could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
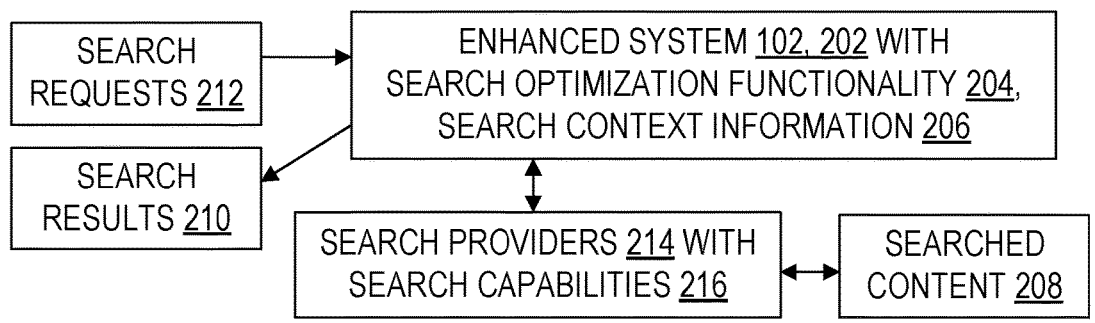
FIG. 2 is a block diagram illustrating a computing system equipped with search optimization functionality, and some aspects of a surrounding environment.
Figure 3:
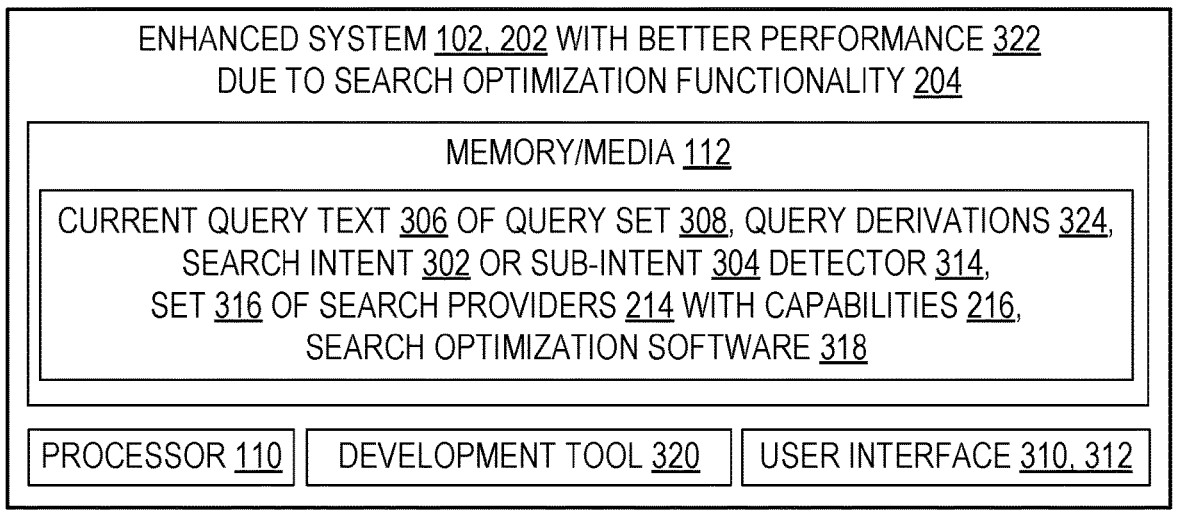
FIG. 3 is a block diagram illustrating an enhanced computing system configured with search optimization functionality.

FIGS. 2 and 3 illustrate an environment having an enhanced system 202, 102 that includes functionality 204 for search optimization. The phrase "search optimization" and similar terminology herein should not be confused with "search engine optimization" (a.k.a. "SEO"). SEO focuses on selecting and organizing online content in order to have the content rank higher in web page search results that are provided by a general-purpose web search engine. By contrast, the present search optimization functionality 204 involves use of search context information 206 which is not part of the searched web pages 208 or the search results 210.

The search context information 206 is generally also not part of the search request 212, but is used instead to select between different search providers 214 based on how well their respective search capabilities 216 match the search intent 302 or search sub-intent 304 that is detected by the search optimization functionality 204. Some embodiments may use search context information 206 to modify a search request 212 before sending the request to the search provider, e.g., when automatic analysis reveals a particular programming language is part of the search context 206, a query string 306 typed by the user may be modified by the enhanced system 202 to include the name of that programming language.

A search request 212 may also be referred to herein as a "query". Each search request includes a query string 306, which may also be referred to herein as a "query text". The collection of query strings 306 received by the enhanced system 202 over some period of time is referred to as the "query set" 308. A given system 202 may maintain a single query set 308 for all search requests regardless of user, or it may maintain a query set 308 per user.

Queries 212 enter the enhanced system 202 through a user interface 310, which is an example of interfaces 312 generally. A search box 702 may be part of a user interface 310; the search box accepts free form query text, which may be typed by a user or be a transcription of spoken queries, for example. The user interface 310 is part of a software development tool 320 in this example, but other tools 122 may also be configured with or utilize search optimization functionality 204. For example, a web browser could be equipped with a plug-in or other query preprocessing software that modifies queries by adding search terms according to detected non-code search sub-intents 304, e.g., to ensure "API" is in the query string when an API documentation search sub-intent 902 is detected, or to add one or more keywords such as "tutorial", "wiki", and "learn" when a topic overview search sub-intent 920 is detected.

In operation, the search optimization functionality 204 gathers search context information 206 and executes a search intent detector 314, which detects a search intent 302 or sub-intent 304 to associate with the query 212. A sub-intent 304 is an example of an intent 302; use of "sub-intent" is meant simply to emphasize that intents can be hierarchical. For instance, a software comparison search sub-intent 926 of a non-code search intent 944 may be detected, or a JavaScript® sub-intent of a code search intent 942 may be detected (mark of Oracle America, Inc.). A given query 212 may have more than one detected intent 302 or sub-intent 304 or both, in some embodiments.

The enhanced system 202 communicates with or, in some embodiments includes, a set 316 of search providers 214. Search optimization software 318 matches queries 212 to search providers 214 based on the search intents 302 of the queries and the search capabilities 216 of the search providers 214. The intent detector 314 may be considered a part of the search optimization software 318, but is called out separately to emphasize the intent detection functionality it embodies. Upon execution, the search optimization software 318 may perform a method 1100 illustrated in one or more of FIGS. 10 and 11.

An enhanced system 202 may be networked generally or communicate in particular (via network or otherwise) with a search provider server 214, 102 and other devices through one or more interfaces 312. An interface 312 may include hardware such as network interface cards, software such as network stacks, APIs, or sockets, combination items such as network connections, or a combination thereof.

An enhanced system 202 will generally provide better performance 322 than a system that lacks search optimization functionality 204, when each system is given the same search requests 212, the same level of network 108 capacity (in terms of bandwidth, jitter, latency, and other network performance metrics), and the same level of underlying computing functionality (in terms of processors 110, memory 112, kernel 120, and other functionality that is not application-specific). System 102 or 202 performance 322 may be measured in various ways. One search performance 322 measure is how much computing resource (e.g., processor cycles, memory amount, network bandwidth) is used to produce the search results 210 that are deemed sufficient in that the user turns to other work within a specified time (e.g., two minutes) instead of submitting an additional search request. Another search performance 322 measure is how many search requests 212 are submitted before the search effort produces search results 210 that are deemed sufficient. User satisfaction could also be surveyed or otherwise measured. Other search performance 322 measures may also be used.

FIG. 4 illustrates several examples of search providers 214. These items are discussed at various points herein, and additional details regarding them are provided in the discussion of a List of Reference Numerals later in this disclosure document.

FIG. 5 illustrates some examples and other aspects of search context information 206. These items are discussed at various points herein, and additional details regarding them are provided in the discussion of a List of Reference Numerals later in this disclosure document.

FIG. 6 illustrates some examples and other aspects of search results 210. For convenience, a library 602 or a package 604 or an API 606 may be considered to be a search result, even if they are not themselves provided in the search result, when they are nonetheless obtainable through a hyperlink or another location identifier that is expressly provided in a search result 210. These items are also discussed at various points herein, and additional details regarding them are provided in the discussion of a List of Reference Numerals later in this disclosure document.

Figure 7:
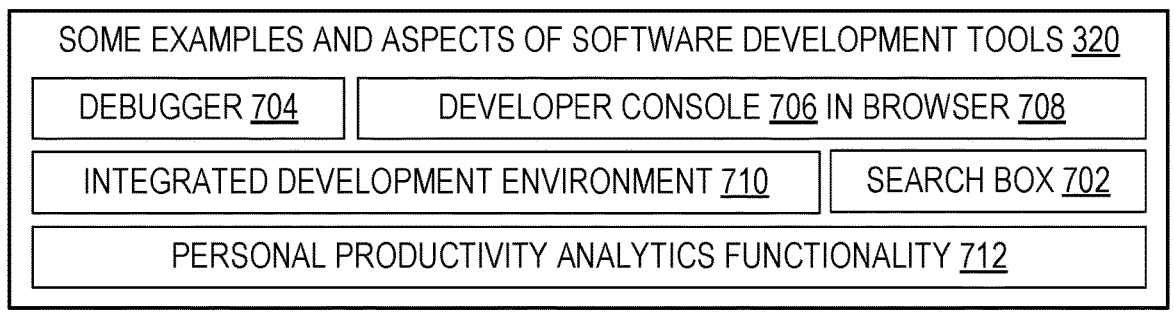
FIG. 7 is a block diagram illustrating some examples of software development tools and their components.

FIG. 7 illustrates some examples and other aspects of software development tools 320. These items are discussed at various points herein, and additional details regarding them are provided in the discussion of a List of Reference Numerals later in this disclosure document.

Figure 8:
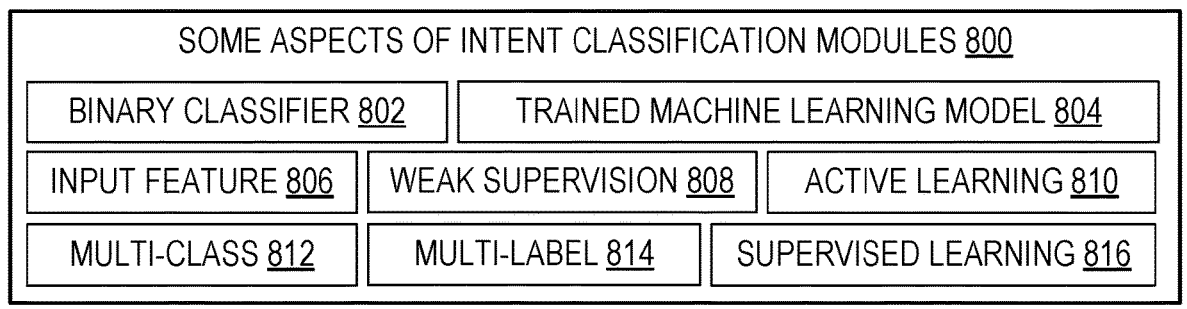
FIG. 8 is a block diagram illustrating some search intent classification modules.

FIG. 8 illustrates some examples and other aspects of search intent classification modules 800; such modules may be employed as machine learning implementations of search intent detectors 314. These items are discussed at various points herein, and additional details regarding them are provided in the discussion of a List of Reference Numerals later in this disclosure document.

Figure 9:
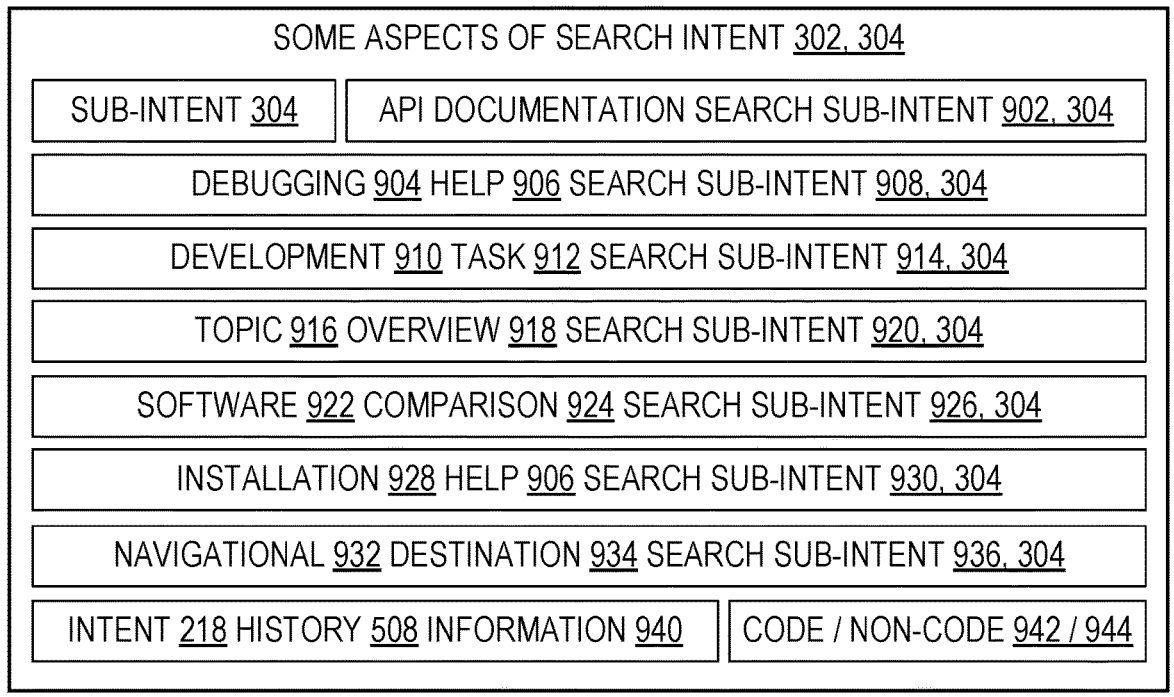
FIG. 9 is a block diagram illustrating some aspects of search intent.

FIG. 9 illustrates some examples and other aspects of search intent 302. These items are discussed at various points herein, and additional details regarding them are provided in the discussion of a List of Reference Numerals later in this disclosure document.

Some embodiments use or provide a functionality-enhanced system, such as system 202 or another system 102 that is enhanced as taught herein. In some embodiments, system 202 is or includes a software development system with a software development tool 320 having a user interface 310 and configured for efficient searches as taught herein. More generally, an example system 202 which is configured to perform efficient searches includes a digital memory 112, and a processor 110 in operable communication with the memory. The processor is configured, e.g., with software 318, to perform intent-based search optimization steps which include (a) receiving a search request 212 via the user interface 310, the search request including a current query text 306 which upon receipt belongs to a set 308 of query texts received by or accessed by the software development tool 320, (b) gathering search context information 206 which includes more than the set 308 of query texts, (c) detecting a search intent 302 based on at least a portion of the gathered search context information, thereby distinguishing 1008 a code search intent 942 from a non-code search intent 944 or distinguishing 1008 between different non-code search intents 304, or both, (d) selecting a search provider 214 from a set 316 of search providers connected with the software development tool, each search provider having one or more respective search capabilities 216, the search provider being selected at least in part by matching the detected search intent with a search capability of the selected search provider, (e) forwarding the current query text or a request derived from it to the selected search provider, and (f) avoiding sending the current query text or request derived from it to at least one non-selected search provider of the set whose search capability does not match the detected search intent. Thus, the software development system 202 is configured to optimize a search that is responsive to the request 212 received via the software development tool user interface 310, by avoiding or reducing usage of search providers 214 whose search capability 216 does not match the detected search intent.

In some embodiments, the software development tool 320 includes at least one of the following: an integrated development environment 710, a debugger 704, or a developer console 706 in a browser 708. In particular, in some embodiments the software development tool 320 includes an integrated development environment 710, the user interface 310 includes a search box 702 configured to receive the search request 212, and the detected search intent 302 indicates an intent 942 to search for source code 432.

In some embodiments, the set 316 of search providers includes at least two of the following: a natural language search provider 420 which performs natural language processing, a web search provider 424, a developer site search provider 428 which gives higher priority to software development web sites 426 than other web sites or searches only software development web sites 426, a software documentation search provider 404 which searches application program interface 606 documentation 402 or software library 602 documentation 402 or software package 604 documentation 402 or a combination of such documentation, a code search provider 434 which searches only for source code 432, a local search provider 442 which searches only in files 440 that are currently open in the software development tool, a project search provider 438 which searches only in projects 436 that are currently open in the software development tool, a solution search provider 408 which searches only in solutions 406 that are currently open in the software development tool, a repository code search provider 416 which searches only in repositories 414 that are currently connected to the software development tool, a regex search provider 412 which utilizes regular expressions 410, or an autocreation search provider 430 which utilizes code synthesis.

In some embodiments, the gathered search context information 206 belongs to at least one of the following categories of gathered search context information: user editing information 502 of the software development tool, project metadata 510 of a project 436 which is open in the software development tool, user notification information 506 of the software development tool, tool configuration information 514 of the software development tool, search intent history 508 information of the software development tool, or tool environment information 518 of the software development tool.

In some embodiments, the system 202 includes an intent classification module 800 which detects the search intent 302 (recall that sub-intents 304 are also intents 302), and the intent classification module includes at least one of the following: a binary classifier 802 which classifies search intent as either code search intent 942 or as non-code search intent 944, a trained machine learning model 804 which employs at least two categories of gathered search context information as input features 806, a trained machine learning model 804 trained using weak supervision 808, a trained machine learning model 804 trained using active learning 810, or a trained machine learning model 804 trained using supervised learning 816.

For some embodiments, natural language models and sub-intents 304 from the software engineering domain (e.g., Debug, API, Informational) are used to train 1124 a binary classifier 802 for distinguishing code search intent 942 from non-code search intent 944 for a user's query.

Some embodiments detect 1006 code search intent 942 based on contextual signals 206 such as cursor position 502, build errors 530 or build warnings 528, time elapsed 532 since the current file has been open, usage of autocompletion 502, or other similar features 806. Some embodiments use contextual signals 206 such as the programming language 546 of the currently opened project 436, of the currently opened solution 406, or of the currently opened file 440, to determine which code search provider to trigger. In the case of projects and files with multiple programming languages, some embodiments identify the programming language of the code surrounding the cursor in order to trigger 1014 the appropriate 1012 code search provider 214.

Other system embodiments are also described herein, either directly or derivable as system versions of described processes or configured media, duly informed by the extensive discussion herein of computing hardware. Examples are provided in this disclosure to help illustrate aspects of the technology, but the examples given within this document do not describe all of the possible embodiments. An embodiment may depart from the examples. For instance, items shown in different Figures may be included together in an embodiment, items shown in a Figure may be omitted, functionality shown in different items may be combined into fewer items or into a single item, items may be renamed, or items may be connected differently to one another. A given embodiment may include or utilize additional or different search intents 302, technical features, intent detection mechanisms 314, search provider capabilities 216, operational sequences, data structures, or search optimization functionalities for instance, and may otherwise depart from the examples provided herein.

Processes (a.k.a. Methods)

Figure 10:
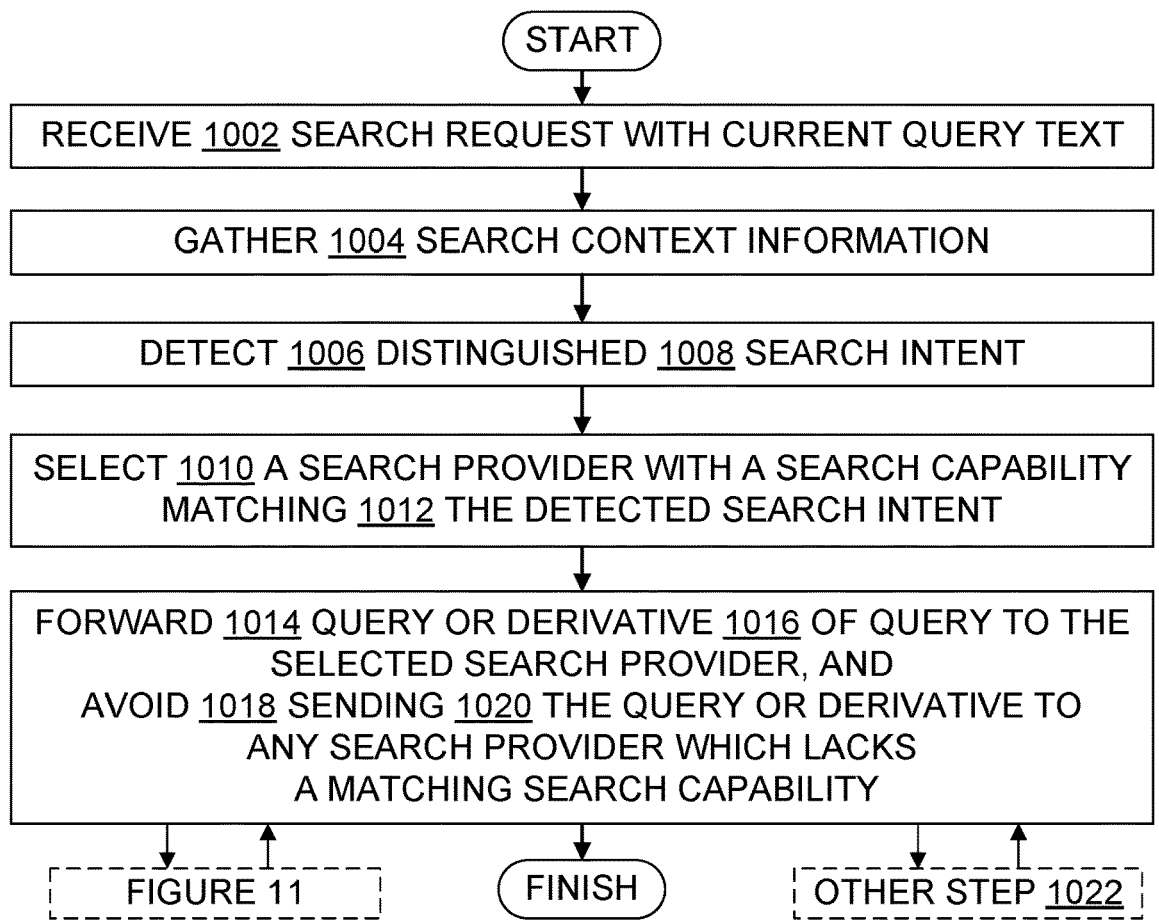
FIG. 10 is a flowchart illustrating steps in some search optimization methods.
Figure 11:
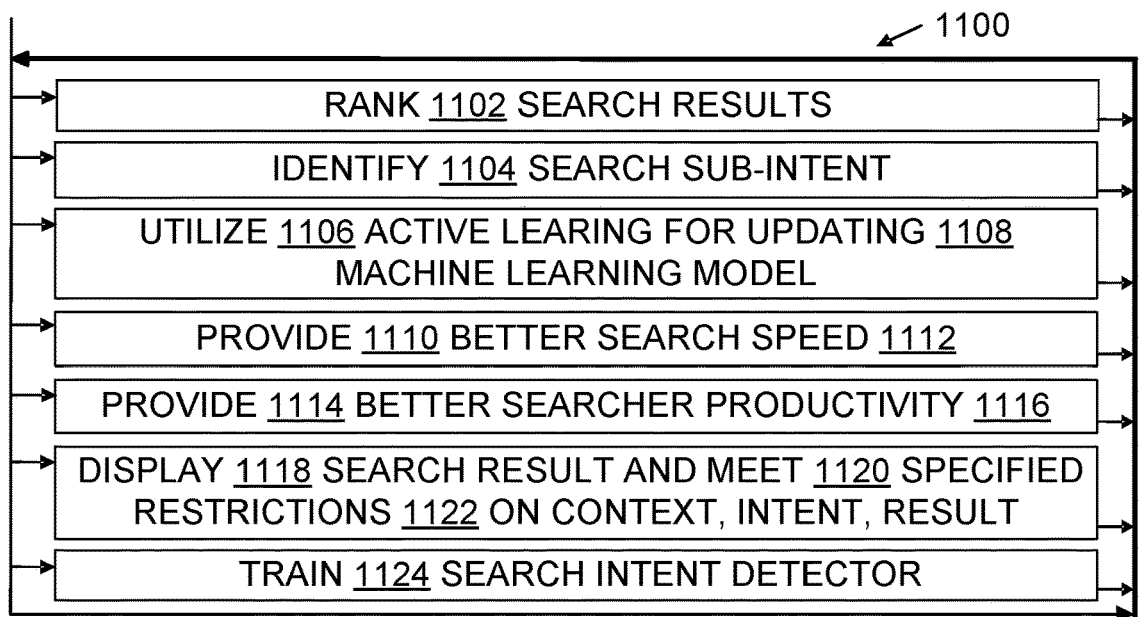
FIG. 11 is a flowchart further illustrating steps in some search optimization methods.

FIG. 10 illustrates a family of methods 1000 that may be performed or assisted by a given enhanced system, such as any system 202 example herein or another functionality 204 enhanced system as taught herein. FIG. 11 further illustrates methods involving search result ranking 1102, performance improvements 1112, 1116, or machine learning model training 1124, 1108, for example. FIG. 10 incorporates all steps shown in FIG. 11. Methods 1000 or 1100 may also be referred to as search optimization "processes" in the legal sense of the word "process".

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For example, in some embodiments a human may specify particular search providers 214 for inclusion within or exclusion from the search provider set 316, e.g., by specifying a preference for a particular web search engine. But no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 10 and 11. Steps may be performed serially, in a partially overlapping manner, or fully in parallel. In particular, the order in which flowchart 1000 or flowchart 1100 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a software development method for promoting search efficiency using context-based search intent detection, including receiving 1002 a search request 212 via a user interface 310 of a software development tool 320, the search request including a current query text 306 which upon receipt belongs to a set 308 of query texts received by or accessed by the software development tool; automatically gathering 1004 search context information 206 which includes more than the set 308 of query texts and a query history 324 derived from the set of query texts; automatically detecting 1006 a search intent 302 based on at least a portion of the gathered search context information, including distinguishing 1008 a code search intent 942 from a non-code search intent 944 or distinguishing between different non-code search intents 304, or both; automatically matching 1012 the detected search intent with a search capability 216 of a search provider 214, the search provider belonging to a set 316 of search providers which are in operable communication with the software development tool; automatically forwarding 1014 the current query text or a request derived from it to the search provider; and automatically avoiding 1018 sending the current query text or request derived from it to a different search provider of the set whose search capability does not match the detected search intent.

In some embodiments, automatically gathering 1004 search context information includes gathering at least one of the following categories 500 of search context information: user editing information 502 of the software development tool, project metadata 510 of a project which is open in the software development tool, or user notification information 506 of the software development tool. Other embodiments also include one or more of the categories 500 shown in FIG. 5, in every possible combination, which for conciseness are not explicitly enumerated here.

Some embodiments include ranking 1102 search results based at least in part on the gathered search context information 206 or the detected search intent 302, or both.

In some embodiments, automatically detecting 1006 the search intent includes identifying 1104 at least one of the following sub-intents 304: an application program interface documentation sub-intent 902 which indicates an intent to search for documentation about a particular application program interface, a debugging help sub-intent 908 which indicates an intent to search for help debugging a particular software development error or a particular software development issue, a development task help sub-intent 914 which indicates an intent to search for information on how to perform a particular software development task, a topic overview sub-intent 920 which indicates an intent to search for an overview of a software development topic, a software comparison sub-intent 926 which indicates an intent to search for a comparison of different pieces of software or different software technologies, an installation help sub-intent 930 which indicates an intent to search for information on how to install or configure particular software, or a navigational destination sub-intent 936 which indicates an intent to search for and navigate to a particular online resource location or a particular web site. Embodiments may identify one or more of the sub-intents 304 shown in FIG. 9, in all possible subsets, which for conciseness are not explicitly enumerated here. Moreover, embodiments may alternatively or in addition identify zero or more coding sub-intents 304 corresponding respectively to, e.g., different programming languages, different software development tools, different industry standards, or other technical characteristics.

Some embodiments utilize 1106 active learning 810 for updating 1108 a machine learning model 804 which performs search intent detection 1006.

In some embodiments, the gathered search context information 206 includes search intent history information 508 of the software development tool for a particular user 104. In some, the gathered search context information 206 includes search intent history information 508 of the software development tool for a particular proper subset of all users 104. Both approaches allow user search intent history to help guide search intent detection, as an input feature 806 (a.k.a. input signal) of a detector 314 that uses machine learning, or as a default value, or as a presumption or weighting to resolve otherwise ambiguous apparent intents. Some embodiments personalize 1124 the machine learning model 804 over time for individual users, e.g., by leveraging 1106 active learning to improve 1108 the accuracy of code search intent detection using weak supervision 808.

Embodiments may provide better performance 322 than alternatives that lack search intent detection as taught herein. For example, over a course of ten searches some embodiments provide search results 210 on average at least three times as fast as an alternative approach which forwards the current query text to every search provider in the set of search providers instead of avoiding 1018 forwarding the current query text to search providers of the set whose search capability 216 does not match 1012 the detected search intent 302.

In some embodiments, automatically gathering 1004 search context information includes gathering at least one of the following: a portion 520 of text located within a predetermined distance 522 of a cursor 524 in a file 440 that is open in the software development tool, a warning message 528 produced by the software development tool, an error message 530 produced by the software development tool, a time elapsed 532 since a most recent opening of a file in the software development tool, a time elapsed 532 since a most recent movement of a cursor in the software development tool, a location 536 of a breakpoint 534 in a file that is open in the software development tool, or a location 540 of a bookmark 538 in a file that is open in the software development tool.

In some embodiments, automatically gathering 1004 search context information includes gathering software development tool state information 544 which is not forwarded 1014 to the search provider, and is not used as a basis for deriving 324 any query that is sent 1020 to the search provider. In other words, the tool state information 544 may be the kind of information that—in the absence of search optimization functionality 204—is used only internally within the tool 320 or only in communications directly between the tool 320 and the tool's user 104. Functionality 204 puts such information 544 to new use, as a basis for detecting search intent 302.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as search intent 302 variables or values or data structures, search optimization software 318, search provider set 316 variables or values or data structures, search provider capability 216 variables or values or data structures, digital gathered search content information 206, and intent classification modules 800, in the form of data 118 and instructions 116, read from a removable storage medium 114 and/or another source such as a network connection, to form a configured storage medium. The configured storage medium 112 is capable of causing a computer system 102 to perform technical process steps for search intent detection 1006 and search optimization by efficiency improvement through search provider selection 1010 and avoidance 1018, as disclosed herein. The Figures thus help illustrate configured storage media embodiments and process (a.k.a. method) embodiments, as well as system and process embodiments. In particular, any of the process steps illustrated in FIG. 10 or 11 or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a software development method for promoting search efficiency using context-based search intent detection. This method includes: receiving 1002 a search request 212 via a user interface of a software development tool, the search request including a current query text which upon receipt belongs to a set of query texts received by or accessed by the software development tool; automatically gathering 1004 search context information 206 which includes more than the set of query texts; automatically detecting 1006 a search intent 302 based on at least a portion of the gathered search context information, including distinguishing 1008 a code search intent 942 from a non-code search intent 944 or distinguishing 1008 between different non-code search intents 304, or both; automatically matching 1012 the detected search intent with a search capability 216 of a search provider 214, the search provider belonging to a set of at least three search providers which are in operable communication with the software development tool, at least one of the search capabilities being a local source code search capability for searching source code 432 on a machine 102 that is running the software development tool; automatically forwarding 1014 the current query text or a request derived from it to the search provider; and automatically avoiding 1018 sending the current query text or request derived from it the current query text to a different search provider of the set whose search capability does not match the detected search intent.

One of skill in the art informed by the teachings herein will recognize a variety of scenarios that utilize search optimization functionality 204. Several scenarios are listed herein as examples, but embodiments are not necessarily limited to any or some or all of these particular examples.

Thus, some embodiments display 1118 a search result produced by the search provider in response to the forwarded current query text, and at least one of the following scenarios occurs.

Scenario A. The gathered search context information 206 includes a message 504 to a user 104, the message 504 was produced by the software development tool 320, the detected search intent 302 is a non-code search intent 944, and the search result 210 includes prose discussing the message. This scenario may occur, for example, when a compiler error message leads to a search result explaining how to resolve the error.

Scenario B. The gathered search context information 206 includes text 520 near a cursor 524 in a file 440 that is open in the software development tool 320, the text 520 near the cursor includes source code 432 in a particular programming language 546, the detected search intent 302 is a code search intent 942, and the search result 210 includes a source code snippet in the particular programming language. This scenario may occur, for example, when a cursor in a C# file leads to a search result including a C# snippet.

Scenario C. The gathered search context information 206 includes project metadata 510 of a project 436 that is open in the software development tool 320, the project metadata identifies a particular programming language 546, the detected search intent 302 is a code search intent 942, and the search result 210 includes a source code snippet 432 in the particular programming language. This scenario may occur, for example, when a Python® project leads to a search result including a Python® snippet (mark of Python Software Foundation).

Scenario D. The gathered search context information 206 includes an identification of a software library 602 that is open in the software development tool 320, the detected search intent 302 is a code search intent 942, and the search result 210 includes a source code 432 invoking the software library. This scenario may occur, for example, when a project containing a C++ JSON library leads to a search result including a C++ snippet.

Scenario E. The gathered search context information 206 includes usage 502 of an autocompletion functionality on source code 432 in the software development tool 320, the source code is in a particular programming language 546, the detected search intent 302 is a code search intent 942, and the search result 210 includes a source code snippet 432 in the particular programming language. This scenario may occur, for example, when a use of autocompletion functionality in an HTML (hypertext markup language) file leads to a search result including an HTML snippet.

Scenario F. The gathered search context information 206 includes time elapsed 532 since opening a new project 436 in the software development tool 320, the detected search intent 302 is a non-code search intent 944, and the search result 210 includes a discussion of a software package 604 or a software library 602 or a software framework 122 that is available for use in the project. This scenario may occur, for example, when a new project being open less than an hour leads to a search result including a list of packages or frameworks, rather than code snippets.

Scenario G. The gathered search context information 206 includes an identification of a particular programming language 546 in the software development tool 320, the query text 306 does not expressly identify the particular programming language, and the search result 210 includes a discussion of a software item (e.g., item 120, 122, 124, 602, 604, or 606, or another piece of software), and the software item is written in the particular programming language. This scenario may occur, for example, when the search query text says only "compiler" without reciting "C#" but the project or file contents or file extension identify C#, which leads to a search result including a discussion of C# compilers or links to C# compilers.

Scenario H. The gathered search context information 206 includes an identification of a format 548 of a file that is open in the software development tool 320, the query text 306 does not expressly identify the format, and the search result 210 includes a discussion of a software item which operates on files 440 of the identified format 548. This scenario may occur, for example, when the search query text says only "convert csv" without reciting "XML" but the project or file contents or file extension or libraries used identify both CSV and XML, which leads to a search result including a discussion of converting CSV to XML.

Some embodiments include training 1124 a search intent detector 314 to automatically detect a search intent 302 based on at least a portion of the gathered search context information 206, with the training including training a machine learning model 804 as part of the detector 314. Some embodiments train 1124 a multi-label classifier 814 or train 1124 a multi-class classifier 812 or train both. In some, training 1124 includes supervised learning 816. In some, training 1124 includes active learning 810. In some, training 1124 includes weak supervision 808. Other machine learning tools and techniques may also be adapted for use in training search intent detectors 314.

In some embodiments, one or more search productivity conditions is satisfied. These may be viewed as examples of improved performance 322.

For example, in some embodiments over a course of ten searches for which the detected search intent 302 is a code search intent 942 the user inserts code 432 from a search result 210 into a source code that is under development by the user at a rate which is at least ten percent greater than a search result code insertion rate of code search results of an alternative approach which forwards the current query text to every search provider in the set of search providers instead of avoiding 1018 forwarding the current query text to search providers of the set whose search capability 216 does not match 1012 the detected 1006 search intent 302.

As another example, some embodiments over a course of ten searches provide search results for which user productivity 1116 is at least twice the user productivity of an alternative approach which forwards the current query text to every search provider in the set of search providers instead of avoiding 1018 forwarding the current query text to search providers of the set whose search capability 216 does not match 1012 the detected 1006 search intent 302. User productivity is measured, e.g., by using a personal productivity analytics functionality 712 of the software development tool.

Some embodiments are well suited for production use, e.g., in an enterprise, institution, agency, or other professional environment. In some, the enhanced computing system 202 performs the context gathering 1004—intent detection 1006—search provider selection 1010 steps at a performance level of an average speed for the three steps as a group of three seconds or less over at least ten searches. Some embodiments perform the group of steps 1004, 1006, 1010 at a higher performance level, with an average speed per group instance of less than two seconds over a course of at least twenty searches. Some embodiments perform at an even higher level, with an average speed per group instance of less than one second, over at least one hundred searches. One of skill will acknowledge that such performance levels—even the lowest one—are not within reach of purely mental activity but instead require an enhanced computing system 202.

Technical Character

The technical character of embodiments described herein will be apparent to one of ordinary skill in the art, and will also be apparent in several ways to a wide range of attentive readers. Some embodiments address technical activities such as gathering digital search context information 206, running search optimization software 318, transmitting digital data to and from a machine learning model 804, and transmitting digital data to and from one or more search engines 214, each of which is an activity deeply rooted in computing technology. Some of the technical mechanisms discussed include, e.g., machine learning models 804, search providers 214, search optimization software 318, interfaces 312, development tools 320, and search boxes 702. Some of the technical effects discussed include, e.g., reducing or avoiding use of search providers 214 whose capabilities 216 do not match 1012 the intent 302 of a given search request 212, computationally providing 1110 better search speeds 1112, and computationally providing 1114 better searcher 104 productivity 1116. Thus, purely mental processes are clearly excluded. Other advantages based on the technical characteristics of the teachings will also be apparent to one of skill from the description provided.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

The internet plays a key role in accomplishing many tasks. In particular, for many tasks a web search is integral to finding relevant information. As in many other domains, web search is heavily used in software engineering (SE) to help with various SE specific tasks such as finding code snippets, debugging, finding documentation, installation, etc.

Some software development tools contain, or may be adapted to contain, a combination search box which provides a single user interaction mechanism for a wide variety of searches. Some versions of Microsoft Visual Studio® tools, for example, could be configured with a search feature consistent with teachings herein to allow users to search for code snippets from the web as well as other information (mark of Microsoft Corporation). Tools from other vendors may also have such features, under license. Different search boxes 702 may be merged together in a single "omni" search box which will allow users to search for not just code snippets, but also packages, documentation, help content, local code, etc. These different kinds of searches may be done by different search providers 214.

A naïve design for such a combination search box would send each entered query to each available search engine. However, in practice invoking all the search providers for each query would be cumbersome for users and inefficient, due to performance and user experience (UX) issues. This insight gives rise to the technical challenge of detecting when the user is searching for a code snippet (e.g., detecting that the search query has code search intent) in order to trigger a code search experience from within the enhanced tool. That enhanced tool 320 could be, for example, a version of a Visual Studio® integrated development environment 710 or another IDE 710 equipped with code search optimization functionality 204, or a functionality 204 enhanced tool that interfaces with a code repository 414. Other tools 320 may also be enhanced, as may software tools that are not necessarily designed for software development, e.g., tools that search for different kinds of results 210 (corresponding to different sub-intents 304) using different search routines 214.

In some embodiments, a system 202 includes an IDE or other software development tool 320 that has a search box or the like in its user interface. The system receives a search query 212, gathers context 206 from the tool (cursor position, error messages, etc.), detects search intent 302 based on the context, selects a well-suited search provider 214 based on the intent, asks the selected provider to do the search, and promotes efficiency by not 1018 asking poorly-suited search providers to do that same search.

Some embodiments described herein may be viewed by some people in a broader context. For instance, concepts such as complexity, focus, efficiency, relevance, or speed may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and effectively detect whether a user is searching for source code, and how to reduce user interface complexity without reducing search performance. Other configured storage media, systems, and processes involving complexity, focus, efficiency, relevance, or speed are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating environments, intent and sub-intent examples, software processes, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
IaaS or IAAS: infrastructure-as-a-service
ID: identification or identity
IP: internet protocol
LAN: local area network
OS: operating system
PaaS or PAAS: platform-as-a-service
RAM: random access memory
ROM: read only memory
TCP: transmission control protocol
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. Search providers 214 may be implemented with services or accessed via services, for example.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Search optimization operations such as gathering 1004 search context information 206, detecting 1006 search intent 302, communicating 1014, 1020 with search providers 214, training 1124 machine learning models 804, displaying 1118 search results 210, and many other operations discussed herein, are understood to be inherently digital. A human mind cannot interface directly with a CPU or other processor, or with RAM or other digital storage, to read and write the necessary data to perform the search optimization steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(5)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as deriving, detecting, displaying, distinguishing, editing, forwarding, gathering, identifying, matching, notifying, opening, providing, ranking, receiving, searching, selecting, sending, training, utilizing (and derives, derived, detects, detected, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as a "computational system" or "computing system", and when in a network may be referred to as a "node"
- 104 users, e.g., an analyst or other user of an enhanced system 202
- 106 peripherals
- 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network
- 110 processor
- 112 computer-readable storage medium, e.g., RAM, hard disks
- 114 removable configured computer-readable storage medium
- 116 instructions executable with processor; may be on removable storage media or in other memory (volatile or non-volatile or both)
- 118 data
- 120 kernel(s), e.g., operating system(s), BIOS, UEFI, device drivers
- 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, browsers, and so on
- 124 applications, e.g., word processors, web browsers, spreadsheets, games, email tools, commands
- 126 display screens, also referred to as "displays"
- 128 computing hardware not otherwise associated with a reference number 106, 108, 110, 112, 114

202 enhanced computers, e.g., computers 102 enhanced with search optimization functionality, or computers which perform a method 1100 or 1000

204 search optimization functionality, e.g., functionality which does at least one of the following: detects a search intent based at least in part on extraquery context information, matches search providers with search intents based on detected search intent and search provider capability, avoids sending searches to search providers whose capabilities do not match detected search intents, conforms with the FIG. 10 flowchart or its constituent flowchart 1100, or otherwise provides capabilities first taught herein 206 search context information; may also be referred to as "extraquery context information"; understood to be in digital form 208 searched content, e.g., web pages, databases, source code files, repository files, knowledge bases, document collections, and other digital information sources which can be searched by at least one search provider; they may be indexed for searching, or brute force search may be used; retrieval from archive, decompression, decryption, or reformatting etc. as needed to permit searching is presumed; unless stated otherwise, searched content does not include features or menu items or settings of the development tool 320 itself 210 search results, e.g., copies of search content 208 or hyperlinks or other identifications of specific search content 208

212 search requests; presumed to be in digital form; may include data in addition to a query string 306, e.g., HTTPS or other protocol data, timestamp data, authentication data, user identification data, checksums, etc.

214 search provider; may also be referred to as a "search engine" or "search routine"; a search provider includes software and includes or uses computer hardware which is configured to search content 208 to locate data that is deemed (by the search provider, at least) responsive to a search request, and to reply to the search request with such responsive content or with an excerpt or summary or location identification of such responsive content 216 search provider capability; may be an input format capability, e.g., whether a natural language processing capability can be applied to search requests, whether logical connectors are supported in search requests, whether regular expressions are supported in search requests; may be a searched content capability, e.g., whether web pages are searched, whether a particular database is searched, whether a particular repository is searched, whether closed files are searched, whether local or remote files or both are searched; may be a speed capability; may be a cybersecurity capability; may be any capability unique to a search provider category example illustrated in FIG. 4 or otherwise disclosed herein 302 search intent; refers to a computing system variable or value or data structure representing a programmatically presumed or inferred or other computationally detected intent of a searcher 104, which does not necessarily match the searcher's actual intent (mind reading is not an implementation requirement), although closer correlations between the search intents 302 and the actual intents will generally tend to provide more productive and commercially successive implementations; refers generally to what kind of search results the search is intended to produce, e.g., code or non-code, or particular kinds of non-code results; intended results may include any of the kinds of content illustrated in FIG. 4 or FIG. 9 or otherwise disclosed herein 304 sub-intent; a sub-intent is an intent 302 in a hierarchy, e.g., a code intent may have different sub-intents for respective programming languages, respective operating systems, respective cloud or on-premise environments, respective technical standards, and so on for other technical characteristics of code or its development environment or its execution environment; a non-code-intent may have different sub-intents for respective subject areas, e.g., installation, debugging, product comparison, security, and so on, including any sub-intent illustrated in FIG. 9 or otherwise disclosed herein 306 query text, e.g., a string typed into a search box 308 query set, e.g., a set of queries received; this item is defined to help define extraquery context information 206 in some embodiments; a query set need not be stored in memory in order to exist for context info 206 definition purposes, because even queries which are not persisted after the return of their respective search results define a set of received queries in that regard; when some or all of a query set is persisted in memory 112, the persisted data is referred to as a "query history"

310 user interface of software development tool 312 interface generally 314 intent detector; a machine learning model or other computational mechanism configured to infer, presume, or otherwise computationally detect at least one search intent 302 based at least in part on search context info 206

316 set of search providers; may be an explicit data structure such as a list or array or table, or may be implicit in code or in network connections 318 search optimization software, e.g., software which upon execution does one or more of the following: contains or invokes a search intent detector 314, matches a detected search intent with a search provider capability, avoids use of an available search provider based on a mismatch between a detected search intent and the search provider's capability(ies), conforms with a method 1000 or a method 1100, or performs any operation or sequence of steps first disclosed herein 320 software development tool, e.g., any tool illustrated in FIG. 7; any tool in a continuous integration or continuous development toolchain; any tool which analyzes, interprets, compiles, refactors, edits, or processes source code or other computer code as opposed to being limited to operations on natural language text; any tool that is designed or used for the creation, installation, administration, enhancement, correction, or evaluation of technical equipment which contains or displays or runs software 322 search performance generally; depending on usage context, refers e.g., to performance of computational resources consumed by a search, or to searcher productivity 324 query history, e.g., a digital representation of multiple queries 212 received by a system 202

402 software documentation generally, e.g., documents which describe or discuss the creation, installation, administration, enhancement, correction, or evaluation of software 404 search provider with a capability to search software documentation 406 solution, e.g., tool or set of related tools or applications or other software sold or licensed as a group, e.g., as a solution to a stated problem or set of related problems; a set of projects may also constitute a solution 408 search provider with a capability to search software content containing or discussing software solution(s)

410 regular expression, also referred to as "regex"

412 search provider with a capability to process search requests based on string(s) matching a regex in a search request 414 software repository, e.g., a version-controlled software storage 416 search provider with a capability to search a repository 418 natural language, e.g., English, Spanish, Arabic, Japanese, etc.

420 search provider with a capability to process search requests based on token extraction or other syntactic or semantic process of natural language in a search request 422 web site; any site or URI accessible using Hypertext Transfer Protocol (HTTP), File Transfer Protocol (FTP), or another communication protocol which fits into one or more layers of the Open Systems Interconnection model or another public computer networking model 424 search provider with a capability to search a web site 426 developer web site, e.g., a web site that focuses on or provides content of particular interest to software developers; a few of the many examples (in alphabetical order) include dzone dot com, github dot com, microsoft dot com, pluralsight dot com, sitepoint dot com, stackoverflow dot com, and w3schools dot corn (marks of their respective owners); may also be referred to as "software development web site"

428 search provider with a capability to search a developer web site 430 search provider with a capability to autocomplete a text from a search request or to computationally synthesize source code in response to a search request 432 software source code; includes code written in high-level programming languages such as C-family languages, LISP, Fortran, ECMAScript, scripting languages, and many others, assembly language, markup languages, data definition languages, database schema definitions, context-free languages and other formal languages, and other languages which are not themselves natural languages but may include remarks, identifiers, or other portions that overlap a natural language 434 search provider with a capability to search source code 436 project, e.g., a set of related files in an integrated development environment or repository or other version controlled system which can be used collectively to build a solution 438 search provider with a capability to search a project 440 local files, e.g., files stored in a particular directory subtree, or on a particular machine, or accessible without a network transmission 442 search provider with a capability to search local files 500 category of search context information, or another aspect of search context information 502 user editing information, e.g., cursor position in an editor tool (a.k.a. "editor"), elapsed time since a specified editor action was commanded by the user (e.g., since a file open, a cursor move, page navigation, scrolling, or a project creation), use of an autocompletion function in an editor, any editing action which can be undone (e.g., by a control-z command), identity or location of any file or project or solution which is currently open in a editor, or editor user identity; for current purposes tools which display content but do not allow editing of the content within the tool are nonetheless considered editing tools since reading is part of editing, and hence such tools have editing info 502

504 user notification, e.g., a message emitted from a tool 320 to a user email or smartphone address, or through a user interface, or to a log file 506 information about a user notification, e.g., timestamp, user response to the notification 508 search intent history, e.g., a sequence of detected search intents;

may include the most recently detected search intent; may be limited by time frame, by search intent category, or by searcher identity, for example; if a history shows code search intents recently, then the detector 314 may give more weight to the current intent also being a code search intent 510 project metadata, e.g., project name, project owner, project files location, project access history, programming languages used, library used, framework used, target architectures, and other technical characteristics of the project 512 tool configuration, e.g., which extensions or plug-ins are loaded, user preference settings, version number, environment settings 514 information about a tool configuration, e.g., timestamp, tool processes running and their owners and other technical characteristics 516 tool environment, e.g., operating system or other kernel, values of environment variables, which repository the tool is connected to, which other tools the tool is connected to, which database is installed on the tool's machine, which web server is installed on the tool's machine, which programming language interpreters or compilers are installed on the tool's machine 518 tool environment, e.g., non-tool processes running and their owners and other technical characteristics 520 text portion, e.g., a string of text; for example, if text near a cursor is C++ source code then a detector may give greater weight to the current search intent being a code search intent, and to a C++ code sub-intent; other correlations may also be leveraged by an embodiment through ranking 1102 or searched content selection, e.g., some libraries are used more often with programming language X than programming language Y 522 distance, e.g., in characters, lines, or another measure of distance from a location in text 524 cursor in a tool indicating a current reference position for editing or other navigation 528 warning message, e.g., a tool-generated message indicating status of a build or other operation which does not necessarily indicate failure or another error; an example of a notification 504

530 error message, e.g., a tool-generated message indicating status of a build or other operation which indicates failure or another error; an example of a notification 504; when the context includes a error message, the search intent may be more likely a non-code search intent such as a debugging sub-intent 908 rather than an intent to search for a code snippet 532 elapsed time since an event of interest; may be measured in processor cycles or milliseconds, for example; when the context 206 indicates a recently created or opened project, the detector may give greater weight to a non-code intent such as a development task sub-intent or topic overview sub-intent or software comparison sub-intent, e.g., when a searcher seeks info about what packages to import or how to set up an overall structure of the project; when the cursor has been near the same position for ten minutes or more the detector may give greater weight to a code intent since the searcher may be seeking a useful snippet to continue coding 534 breakpoint in a debugger; may include any information associated with the breakpoint, e.g., code to execute or condition to test when the breakpoint is encountered 536 location of a breakpoint within code being debugged 538 bookmark in a file or a browser, for example 540 location of a bookmark, or a location specified by a bookmark 542 development tool state, e.g., any value, setting, status, history entry, or other technical characteristic of a tool's code which is explicitly or implicitly read or written during execution of the tool's code 544 information about a development tool state, e.g., timestamp, whether the state is visible to a searcher 104

546 programming language; includes any language in which source code 432 is written 548 format of a file, e.g., comma separated values, executable file formats, formats specific to particular word processors, plain text format, etc.

602 software library, e.g., dynamic link file, object file, extension, or plug-in 604 software package, a.k.a. software suite 606 application program interface (API)

702 search box, e.g., dialog box or command line or other user interface mechanism for accepting search queries 704 debugger 706 developer console; may also be referred to as a development console, a developer plug-in, a development plug-in, a developer extension, or a development extension, for example 708 web browser 710 integrated development environment (IDE)

712 personal productivity analytics code or other functionality 800 classification module; an example of a search intent detector implemented using machine learning technology 802 binary classifier, e.g., a model 804 that classifies search intent as code intent or non-code intent 804 trained machine learning model, e.g., a classifier or neural net 806 input feature to a model 804; also called a "signal"

808 weak supervision, e.g., machine learning in which noisy or imprecise data serves as a supervision signal for labeling training data during supervised learning 810 active learning, e.g., machine learning which utilizes user queries to assist data labeling 812 multi-class classifier, e.g., a model 804 which classifies search requests into three or more sub-intents 814 multi-label classifier, e.g., a model 804 by which a given search request may be assigned two or more search intents 816 supervised learning, e.g., machine learning that trains a model based on labelled examples 902 sub-intent to search for documentation of or about an API 904 debugging, e.g., using a debugger or a tool that analyzes software behavior or performance 906 help, e.g., aid, assistance, commentary, suggestions, tutorials, examples, guidelines, requirements, or anecdotes about a topic of interest 908 sub-intent to search for documentation of or about debugging, either generally or with respect to a particular error or concern 910 development, e.g., creation, enhancement, correction, or evaluation of software 912 task, e.g., in the project management sense of a particular desired accomplishment 914 sub-intent to search for documentation of or about a development task 916 topic, e.g., item, task, subject, field of study, or concept 918 overview, e.g., summary, abstract, or introduction 920 sub-intent to search for documentation with an overview of a topic 922 software, e.g., source code, executable code, interpreted code, firmware, BIOS or UEFI code, kernels 120, tools 122, 320, applications 124

924 comparison, e.g., feature lists, reviews, recommendations 926 sub-intent to search for documentation with a comparison of software 928 installation, e.g., placing new or updated software on a system 102, or configuring a system 102

930 sub-intent to search for documentation of or about installation 928

932 navigation using a web site name or URL or other identifier(s)

934 destination, e.g., a web site, database, or other content collection or a specific content item 936 sub-intent to search for a navigation destination 940 information about a search intent history, e.g., limits or filters on what users, time frames, intents are included or excluded from a history 508

942 detected intent to search for source code, without necessarily excluding other kinds of search result 944 detected intent to search for content other than source code, without necessarily excluding source code from search results 1000 flowchart; 1000 also refers to search optimization methods illustrated by or consistent with the FIG. 10 flowchart (which incorporates the steps of FIG. 11)

1002 receive a search request; performed computationally, e.g., using network transmission, API, search box, user interface, or other computational mechanisms 1004 gather search context information; performed computationally, e.g., using network transmission, APIs, reading variables or other data structures, or other computational mechanisms 1006 detect a search intent; performed computationally, e.g., by execution of a detector 314

1008 distinguish between search intents or sub-intents; performed computationally, e.g., by a binary classifier 802 or a multi-class classifier 812

1010 select a search provider; performed computationally, e.g., by ranking search providers according to the extent of match between their search capabilities and detected search intents 1012 match search capabilities and detected search intents; performed computationally, e.g., by a table or jump mechanism which maps intents to capabilities, e.g., map code intent 942 to source code search providers 434, repository search providers 416, and project search providers 438, map debugging help sub-intent 908 to developer site search providers 428, map installation help sub-intent 930 to software documentation search providers 404 and solution search providers 408, and so on, with the understanding that different embodiments may utilize the same or different mappings

1014 forward query or derivative of query to search provider; performed computationally, e.g., using network transmission, API, or other computational mechanisms

1016 derivative of query, e.g., query with keywords added or changed, scope filters added or changed

1018 avoid sending a query to a search provider even though communication with that search provider is available and indeed a different query may have been sent to that search provider from the same search box

1020 sending a query to a search provider whose capability does not match any of the detected search intents

1022 any step discussed in the present disclosure that has not been assigned some other reference numeral

1100 flowchart; 1100 also refers to search optimization methods illustrated by or consistent with the FIG. 11 flowchart

1102 rank search results; performed computationally

1104 identify a sub-intent from among those illustrated in Figure or otherwise taught herein; performed computationally

1106 utilize active learning during machine learning

1108 update a machine learning model; this is an example of training

1110 provide better search speed than an alternative which does not employ functionality 204

1112 search speed, e.g., time from entry of search request to display of search results

1114 provide better searcher productivity than an alternative which does not employ functionality 204

1116 searcher productivity, e.g., search satisfaction with search results, searcher score per analytics 712, or number of search results or searches per time period with acceptable search results; in some embodiments searcher productivity is inferred based on whether the searcher employed the search results in editing (e.g. inserted code found by the search) instead of continuing to search or exiting the tool or turning attention to a different file

1118 display search result, e.g., on screen, in email or other digital communication to user, or by vocalization

1120 meet specified restrictions on context, intent, results, or combination thereof

1122 restrictions on context, intent, results, or combination thereof

1124 perform or utilize machine learning model training

CONCLUSION

In short, the teachings herein provide a variety of search optimization functionalities 204 which operate in enhanced systems 202. Embodiments promote 1114 searcher productivity 1116 and provide 1110 efficient search engine usage by using extraquery context 206 to detect 1006 a searcher's intent 302, and using 1010 detected intent 302 to match 1012 searches 212 to well-suited search providers 214. Extraquery context 206 may include cursor 524 location 502, open files 440 information 502, and other editing information 502, tool 320 state 542 information 544, tool 320 configuration 512 information 514, tool 320 environment 516 information 518, project 436 metadata 510, and other information 206 that is external to actual search query text 306. Search intent 302 may be a code intent 942 (e.g., seeking snippets of source code 432) or a non-code intent 944 (e.g., seeking documentation 402). Sub-intents 304 may be distinguished 1008 for different kinds of documentation 402 or different programming languages 546, for example. Search provider 214 capabilities 216 may reflect input formats such as natural language 418 or logical operator usage, or searched content 208 scope such as web-wide or local, or other search provider 214 technical characteristics. Search intent 302 detection 1006 for search provider 214 selection 1010 permits efficient and effective use of a single search box 702 for a wide variety of different searches for different kinds of results 210, thereby simplifying a development tool 320 user interface 310.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other vendors.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 10 and 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development system configured for efficient searches, the system comprising:
    a digital memory;
    a software development tool having a user interface; and
    a processor in operable communication with the digital memory, the processor configured to perform intent-based search optimization steps which include (a) receiving a search request via the user interface, the search request including a current query text which upon receipt belongs to a set of query texts received by or accessed by the software development tool, (b) gathering search context information which includes more than the set of query texts, (c) detecting a search intent based on at least a portion of the gathered search context information, thereby distinguishing a code search intent from a non-code search intent or distinguishing between different non-code search intents, or both, (d) selecting a search provider from a set of search providers connected with the software development tool, each search provider having one or more respective search capabilities, the search provider being selected at least in part by matching the detected search intent with a search capability of the selected search provider, (e) forwarding the current query text or a request derived from it to the selected search provider, and (f) avoiding sending the current query text or request derived from it to at least one non-selected search provider of the set whose search capability does not match the detected search intent;
    whereby the software development system is configured to optimize a search responsive to the search request received via the software development tool user interface, by avoiding or reducing usage of search providers whose search capability does not match the detected search intent.

2. The system of claim 1, wherein the software development tool includes at least one of the following:
an integrated development environment;
a debugger; or
a developer console in a browser.

3. The system of claim 1, wherein the set of search providers includes at least two of the following:
a natural language search provider which performs natural language processing;
a web search provider;
a developer site search provider which gives higher priority to software development web sites than other web sites;
a developer site search provider which searches only software development web sites;
a software documentation search provider which searches for at least one of: application program interface documentation, software library documentation, or software package documentation;
a code search provider which searches only for source code;
a local search provider which searches only in files that are currently open in the software development tool;
a project search provider which searches only in projects that are currently open in the software development tool;
a solution search provider which searches only in solutions that are currently open in the software development tool;
a repository code search provider which searches only in repositories that are currently connected to the software development tool;
a regex search provider which utilizes regular expressions; or
an autocreation search provider which utilizes code synthesis.

4. The system of claim 1, wherein the gathered search context information belongs to at least one of the following categories of gathered search context information:
user editing information of the software development tool;
project metadata of a project which is open in the software development tool;
user notification information of the software development tool;
tool configuration information of the software development tool;
search intent history information of the software development tool; or
tool environment information of the software development tool.

5. The system of claim 1, wherein the system includes an intent classification module which detects the search intent, and the intent classification module includes at least one of the following:
a binary classifier which classifies search intent as either code search intent or as non-code search intent;
a trained machine learning model which employs at least two categories of gathered search context information as input features;
a trained machine learning model trained using weak supervision;
a trained machine learning model trained using active learning; or
a trained machine learning model trained using supervised learning.

6. The system of claim 1, wherein the software development tool includes an integrated development environment, the user interface includes a search box configured to receive the search request, and the detected search intent indicates an intent to search for source code.

7. A software development method for promoting search efficiency using context-based search intent detection, the method comprising:
receiving a search request via a user interface of a software development tool, the search request including a current query text which upon receipt belongs to a set of query texts received by or accessed by the software development tool;
automatically gathering search context information which includes more than the set of query texts and a query history derived from the set of query texts;
automatically detecting a search intent based on at least a portion of the gathered search context information, including distinguishing a code search intent from a non-code search intent or distinguishing between different non-code search intents, or both;
automatically matching the detected search intent with a search capability of a search provider, the search provider belonging to a set of search providers which are in operable communication with the software development tool;
automatically forwarding the current query text or a request derived from it to the search provider; and
automatically avoiding sending the current query text or request derived from it to a different search provider of the set whose search capability does not match the detected search intent.

8. The method of claim 7, wherein automatically gathering search context information comprises gathering at least one of the following categories of search context information:
user editing information of the software development tool;
project metadata of a project which is open in the software development tool; or
user notification information of the software development tool.

9. The method of claim 7, further comprising ranking search results based at least in part on the gathered search context information or the detected search intent, or both.

10. The method of claim 7, wherein automatically detecting the search intent comprises identifying at least one of the following sub-intents:
an application program interface documentation sub-intent which indicates an intent to search for documentation about a particular application program interface;
a debugging help sub-intent which indicates an intent to search for help debugging a particular software development error or a particular software development issue;
a development task help sub-intent which indicates an intent to search for information on how to perform a particular software development task;
a topic overview sub-intent which indicates an intent to search for an overview of a software development topic;
a software comparison sub-intent which indicates an intent to search for a comparison of different pieces of software or different software technologies;

an installation help sub-intent which indicates an intent to search for information on how to install or configure particular software; or a navigational destination sub-intent which indicates an intent to search for and navigate to a particular online resource location or a particular web site.

11. The method of claim 7, further comprising utilizing active learning for updating a machine learning model which performs search intent detection.

12. The method of claim 7, wherein the gathered search context information includes search intent history information of the software development tool for a particular user.

13. The method of claim 7, wherein over a course of ten searches the method provides search results on average at least three times as fast as an alternative approach which forwards the current query text to every search provider in the set of search providers instead of avoiding forwarding the current query text to search providers of the set whose search capability does not match the detected search intent.

14. The method of claim 7, wherein automatically gathering search context information comprises gathering at least one of the following:
 a portion of text located within a predetermined distance of a cursor in a file that is open in the software development tool;
 a warning message produced by the software development tool;
 an error message produced by the software development tool;
 a time elapsed since a most recent opening of a file in the software development tool;
 a time elapsed since a most recent movement of a cursor in the software development tool;
 a location of a breakpoint in a file that is open in the software development tool; or
 a location of a bookmark in a file that is open in the software development tool.

15. The method of claim 7, wherein automatically gathering search context information comprises gathering software development tool state information which is not forwarded to the search provider, and is not used as a basis for deriving any query that is sent to the search provider.

16. A computer-readable storage medium configured with data and instructions which upon execution by a processor cause a computing system to perform a software development method for promoting search efficiency using context-based search intent detection, the method comprising:
 receiving a search request via a user interface of a software development tool, the search request including a current query text which upon receipt belongs to a set of query texts received by or accessed by the software development tool;
 automatically gathering search context information which includes more than the set of query texts;
 automatically detecting a search intent based on at least a portion of the gathered search context information, including distinguishing a code search intent from a non-code search intent or distinguishing between different non-code search intents, or both;
 automatically matching the detected search intent with a search capability of a search provider, the search provider belonging to a set of at least three search providers which are in operable communication with the software development tool, at least one of the search capabilities being a local source code search capability for searching source code on a machine that is running the software development tool;
 automatically forwarding the current query text or a request derived from it to the search provider; and
 automatically avoiding sending the current query text or request derived from it the current query text to a different search provider of the set whose search capability does not match the detected search intent.

17. The storage medium of claim 16, wherein the method further comprises displaying a search result produced by the search provider in response to the forwarded current query text, and wherein at least one of the following occurs:
 the gathered search context information includes a message to a user, the message was produced by the software development tool, the detected search intent is a non-code search intent, and the search result includes prose discussing the message;
 the gathered search context information includes text near a cursor in a file that is open in the software development tool, the text near the cursor includes source code in a particular programming language, the detected search intent is a code search intent, and the search result includes a source code snippet in the particular programming language;
 the gathered search context information includes project metadata of a project that is open in the software development tool, the project metadata identifies a particular programming language, the detected search intent is a code search intent, and the search result includes a source code snippet in the particular programming language;
 the gathered search context information includes an identification of a software library that is open in the software development tool, the detected search intent is a code search intent, and the search result includes a source code invoking the software library;
 the gathered search context information includes usage of an autocompletion functionality on source code in the software development tool, the source code is in a particular programming language, the detected search intent is a code search intent, and the search result includes a source code snippet in the particular programming language;
 the gathered search context information includes time elapsed since opening a new project in the software development tool, the detected search intent is a non-code search intent, and the search result includes a discussion of a software package or a software library or a software framework that is available for use in the project;
 the gathered search context information includes an identification of a particular programming language in the software development tool, the query text does not expressly identify the particular programming language, and the search result includes a discussion of a software item, and the software item is written in the particular programming language; or
 the gathered search context information includes an identification of a format of a file that is open in the software development tool, the query text does not expressly identify the format, and the search result includes a discussion of a software item which operates on files of the identified format.

18. The storage medium of claim 16, wherein the method further comprises training a search intent detector to automatically detect a search intent based on at least a portion of the gathered search context information, the training comprising training a machine learning model.

19. The storage medium of claim 16, wherein the method further comprises training a multi-label classifier or training a multi-class classifier or training both, and wherein said training comprises supervised learning.

20. The storage medium of claim 16, wherein at least one of the following sets of search productivity conditions is satisfied:

over a course of ten searches for which the detected search intent is a code search intent the user inserts code from a search result into a source code that is under development by the user at a rate which is at least ten percent greater than a search result code insertion rate of code search results of an alternative approach which forwards the current query text to every search provider in the set of search providers instead of avoiding forwarding the current query text to search providers of the set whose search capability does not match the detected search intent; or over a course of ten searches the method provides search results for which user productivity is at least twice the user productivity of an alternative approach which forwards the current query text to every search provider in the set of search providers instead of avoiding forwarding the current query text to search providers of the set whose search capability does not match the detected search intent, wherein user productivity is measured using personal productivity analytics functionality of the software development tool.

\* \* \* \* \*